United States Patent [19]

Deter et al.

[11] Patent Number: 5,485,225
[45] Date of Patent: Jan. 16, 1996

[54] VIDEO PROJECTION SYSTEM USING PICTURE AND LINE SCANNING

[75] Inventors: Christhard Deter; Jörg Wunderlich, both of Gera, Germany

[73] Assignee: Schneider Elektronik Rundfunkwerke GmbH, Nersingen, Germany

[21] Appl. No.: 270,259

[22] Filed: Jul. 5, 1994

[30] Foreign Application Priority Data

Jul. 23, 1993 [DE] Germany ............. 43 24 848.9

[51] Int. Cl.⁶ ................................. H04N 5/66
[52] U.S. Cl. ........................... 348/804; 348/744
[58] Field of Search ................. 348/804, 739, 348/244; H04N 5/66

[56] References Cited

U.S. PATENT DOCUMENTS

| | | |
|---|---|---|
| 4,003,080 | 1/1977 | Maiman et al. . |
| 4,085,420 | 4/1978 | Stukenbrock ............... 348/804 |
| 4,295,159 | 10/1981 | Carollo et al. ............. 348/804 X |
| 4,347,508 | 8/1982 | Spooner ..................... 348/804 X |
| 4,427,977 | 1/1984 | Carollo et al. ............. 348/804 |
| 5,140,427 | 8/1992 | Nakane et al. . |
| 5,253,073 | 10/1993 | Crowley ..................... 348/804 X |

FOREIGN PATENT DOCUMENTS

| | | |
|---|---|---|
| 0311843 | 4/1989 | European Pat. Off. . |
| 2830061 | 1/1980 | Germany . |
| 2-118624 | 5/1990 | Japan . |
| 3-3491 | 1/1991 | Japan . |

OTHER PUBLICATIONS

Patent Abstracts of Japan, vol. 12, No. 106 (E–596), Apr. 6, 1998 (corresponding to Japanese JP–62233982).
Patent Abstracts of Japan, vol. 9, No. 266 (E–352), Oct. 23, 1985 (corresponding to Japanese JP–60111575).
Article: German Journal: Funkschau, vol. 4, 1970, p. 286.
Article: Teiichi Taneda et al, "High–Quality Laser Color Television Display", Journal of the SMPTE, vol. 82, Jun. 1973, pp. 470–474.

*Primary Examiner*—Victor R. Kostak
*Attorney, Agent, or Firm*—McAulay Fisher Nissen Goldberg & Kiel

[57] ABSTRACT

A video projection system with at least one light source which can be controlled in intensity and generates at least one light bundle and with a deflecting device which deflects the light bundle sequentially to produce picture points of a video picture on a screen by picture and line scanning has two component groups, the first of which contains at least one light source and has a light output from which at least one light bundle exits, while the second component group contains the deflecting device and has a light input through which a light bundle can be imaged into the deflecting device. Further, a light transmission device is provided which enables the light output of the first component group to be optically connected with the light input of the second component group.

20 Claims, 3 Drawing Sheets

VIDEO PROJECTION SYSTEM USING PICTURE AND LINE SCANNING

BACKGROUND OF THE INVENTION a) Field of the Invention

The invention is directed to a video projection system with at least one light source which can be controlled in intensity and which generates at least one light bundle and with a deflecting device which deflects the light bundle sequentially to produce picture points of a video picture on a screen by picture and line scanning.

b) Background Art

A video projection system of the above type is known from "Funkschau" 1970, issue 4, page 286. This is a video projection system for color pictures whose different color signals are produced by lasers and in which the light bundles emitted by the lasers are changed in intensity corresponding to the color value of each picture point of the video picture by means of light modulators. The light bundles emitted by the light modulators are combined by means of dichroic mirrors to form a common bundle of rays which is deflected via a mechanical-optical deflection system for scanning of picture and lines and is projected on a screen. With very large screen sizes, the lasers must be designed for correspondingly high outputs, which leads to a considerable space requirement for the lasers which can be employed. In addition to the size of the lasers, the cooling required by these lasers presents another problem standing in the way of a compact construction. Therefore, video systems of this type are costly and require a large amount of space so that they cannot be used in the home, for example.

The above-mentioned article from "Funkschau" also describes another video projection system which requires even more space, since the different colors must be filtered out along a prismatic path. Moreover, the vertical deflection in this system works with a vibrating mirror. This video projection system thus requires additional beam splitters and additional mirrors in the deflecting device which increases the space requirement as well as construction costs.

A suggestion for realizing a compact construction in a video system is found in DE 34 04 412 A1 which describes a digital, flat large color television screen. In this video system, the picture points of a video picture are projected onto a screen by means of light-guiding or optical fibers which spread out in the direction of the screen. Spreading the optical fibers can produce on the screen a picture which is larger than the primary image. Further, the use of optical fibers makes it possible to choose the location for the light generation independently of the position of the screen so that the space requirement can be minimized.

However, a disadvantage in this technique consists in that an optical fiber is required for each picture point. Thus, in this example, 519,792 optical fibers are required for transmitting the picture. Moreover, these fibers must be bonded together in an ordered manner. The cost of producing such a system is therefore extremely high and the work-load per optical fiber is low. There is also a high rejection rate involved in production due to the required exact adjustment of the optical fibers relative to one another.

OBJECT AND SUMMARY OF THE INVENTION

On this basis, the present invention has, as a primary object, the design of a video projection system of the type indicated above in such a way that it has a broader application, and in particular permits an especially compact and variable construction, and moreover can be produced economically.

This object and others are met in a video projection system of the type mentioned above in that this video projection system has two component groups, the first of which contains at least one light source and is provided with a light output from which at least one light bundle exits, while the second component group contains the deflecting device and is outfitted with a light input through which a light bundle can be imaged into the deflecting device, and in that a light transmission device is provided for optically connecting the light output of the first component group with the light input of the second component group and allows an optional arrangement of the two component groups relative to each other. In this regard, the term "optional" means that the operational connection of the first and second component groups with respect to the light transmission device is selectably arranged.

In the video projection system according to the invention, the light generating means and the deflecting device are arranged in separate and distinct component groups and are only optically connected by way of the light transmission device. In so doing, the spatial arrangement of these component groups can vary widely so that the space requirement can be minimized as a whole and a substantially improved cooling is enabled, since, for example, the first component group containing the lasers can be arranged at an easily cooled location regardless of the position of the second component group.

Due to the invention, it is even possible to set up the first component group separately from the second component group in a different room and to transmit the laser light from one room to the other room only by means of the light transmission device. This provides a particularly broad range of applications of the video projection system according to the invention.

The video projection system according to the invention has the further advantage of simple maintenance, since both the lasers and the deflecting device can be kept freely accessible. Finally, the video projection system according to the invention also proves relatively uncomplicated in comparison to the known systems.

The invention can be used for black-and-white pictures as well as for producing color video pictures.

In an advantageous further development of the invention, the light transmission device contains a mirror system. Mirrors are standard structural component parts by means of which even a complicated optical connection between spatially separated component groups can be produced in a simple manner. The relative position of mirrors can be moved or adjusted so that the light transmission device can be rapidly adapted to the light path between the first component group and the second component group.

In another preferred further development of the invention, the light transmission device contains at least one optical fiber. The most complicated optical transmission paths can easily be overcome with this solution without having to adjust to different corners around which the light bundle must be deflected or bent. Optical fibers with very different transmission characteristics for the wavelengths of the transmitted light are currently available at economical prices so that the cost of such a solution remains limited. At least one optical fiber is preferably constructed as a multimode fiber which can simultaneously transmit light bundles of different wavelengths and colors so that the cost of the light transmission device for color video pictures is particularly low, since only one optical fiber is required in principle, although more than one optical fiber can be used in special applications.

According to another advantageous further development of the invention for a color video picture with at least three light sources with different wavelengths, an optical arrangement is provided which combines the light bundles emitted from the light sources to form a common light bundle which is aligned in such a way that it enters at the input side of the light transmission device. The light sources can be lasers, but it is also possible to use LEDs whose output beam is bundled by means of an optical system.

The light bundles can be combined by an optical arrangement to form a common light bundle in different ways. For example, a mirror system can be used advantageously for this purpose. But it is also possible to couple the light bundle emitted from the light sources into the multimode fibers by means of optical fibers. Components of the integrated optical system can be used for this purpose. Another preferred possibility consists in using fiber-optic couplers with a plurality of input fibers and an output fiber in which the light-guiding cores of the input fibers are optically connected with the light-guiding core of the output fiber, so that the light bundles can be combined to form a common light bundle.

Even for multimode fibers, the transmission characteristic can have a disadvantageous wavelength dependence, e.g. in that the damping of the intensity is greater at one wavelength than at another. This could be compensated for, e.g. by setting the light sources to various degrees of intensity. However, such a compensation has only limited value in view of the disproportionate cost for a laser with increased output. For this reason, it is preferable to use a multimode fiber which transmits the light of the light sources at different wavelengths with virtually no damping or to ensure that the difference in damping from one wavelength to another is only insubstantial so that the maximum deviation is less than 15%.

An advantageous further development of the invention also consists in that the optical arrangement for combining the individual light bundles contains dichroic mirrors whose mirror characteristics and transmittance properties substantially depend on the wavelength of the light. An appropriate choice of the coating of the dichroic mirrors allows practically 100% of the intensity of the light bundles to be reflected or passed.

In another advantageous further development of the invention for a color video picture with at least three light sources with different wavelengths, at least one monomode fiber is provided for each wavelength for the transmission of each light bundle by means of the light transmission device. The light bundles of different wavelengths are accordingly combined at the output of the light transmission device to form a common light bundle before it is imaged in the deflecting device.

According to another preferred construction of the video projection system according to the invention, a first optical system which couples the incident light into the optical fiber is arranged at the input side of the light transmission device. Such an optical system is especially advisable as the total intensity of a light bundle can accordingly be coupled in the optical fiber in a purposeful manner. This makes it possible to operate the light sources, particularly the lasers, at the lowest possible output, since losses can then be kept to a minimum. Further, the requirement for manufacturing tolerances or adjustment are also reduced when focussing the input-side light bundle on a core of an optical fiber, since the input-side light bundle can be imaged on the core of the optical fiber by means of the optical system even when this light bundle is slightly offset.

A coupling in of the light bundle can be achieved in a particularly advantageous manner when the image-side focal point of the first optical system is situated in the light entry surface of the optical fiber. Accordingly, not only is there an exact coupling in of the light bundle in the core of the optical fiber, but this also results in the advantageous secondary effect that the light bundle can be introduced on the input side centrally into the optical fiber at a certain point, the focal point of the optical system. This is done so that different light beams in the light bundle always traverse distances of approximately identical length and the number of total reflections in the light guides is approximately identical for all beams. Accordingly, the coherence characteristics of a light bundle experience only minimal change when passing through the optical fiber.

A further advantageous development of the invention consists in that a second optical system which bundles the light exiting from the optical fibers or focusses it into the deflecting device is arranged at the output side of the light transmission device. This partially compensates for losses due to changes in the coherence behavior in the optical fibers. Further, a sharp point is imaged on the screen by the deflecting device as a result of the second optical system, which substantially improves the picture quality. An aperture associated with the second optical system is preferably designed in such a way that the light beam exiting from the light outlet surface of an optical fiber is fully covered by the aperture. Accordingly, the entire solid angle range of the light exiting from the optical fiber can be covered so that there are virtually no losses in intensity.

According to another advantageous construction of the invention, an object-side focal point associated with the second optical system is arranged in the light outlet surface of the optical fibers so that the second optical system can achieve a particularly favorable bundling and focussing of light.

The first and/or second optical system can be an individual lens or a multiple-stage lens system, for example.

In the video projection system according to the invention, an optical system is also advantageously provided between the deflecting device and screen. On the output side, this optical system enlarges the solid angle covered by the deflecting device on the input side when deflecting a light bundle for picture and line scanning. The required space between the deflecting device and screen can accordingly be reduced while maintaining the same picture size and the video projection system according to the invention can be constructed in a particularly flat manner, thus enabling the use of video projection systems also in the home.

In the following, the invention is explained in more detail by way of example with reference to the drawings.

DESCRIPTION OF THE PREFERRED EMBODIMENTS

The figures illustrate video projection systems for color video pictures, since such systems permit an illustration of the greatest possible number of characteristics of the video projection system according to the invention.

Figure 1:
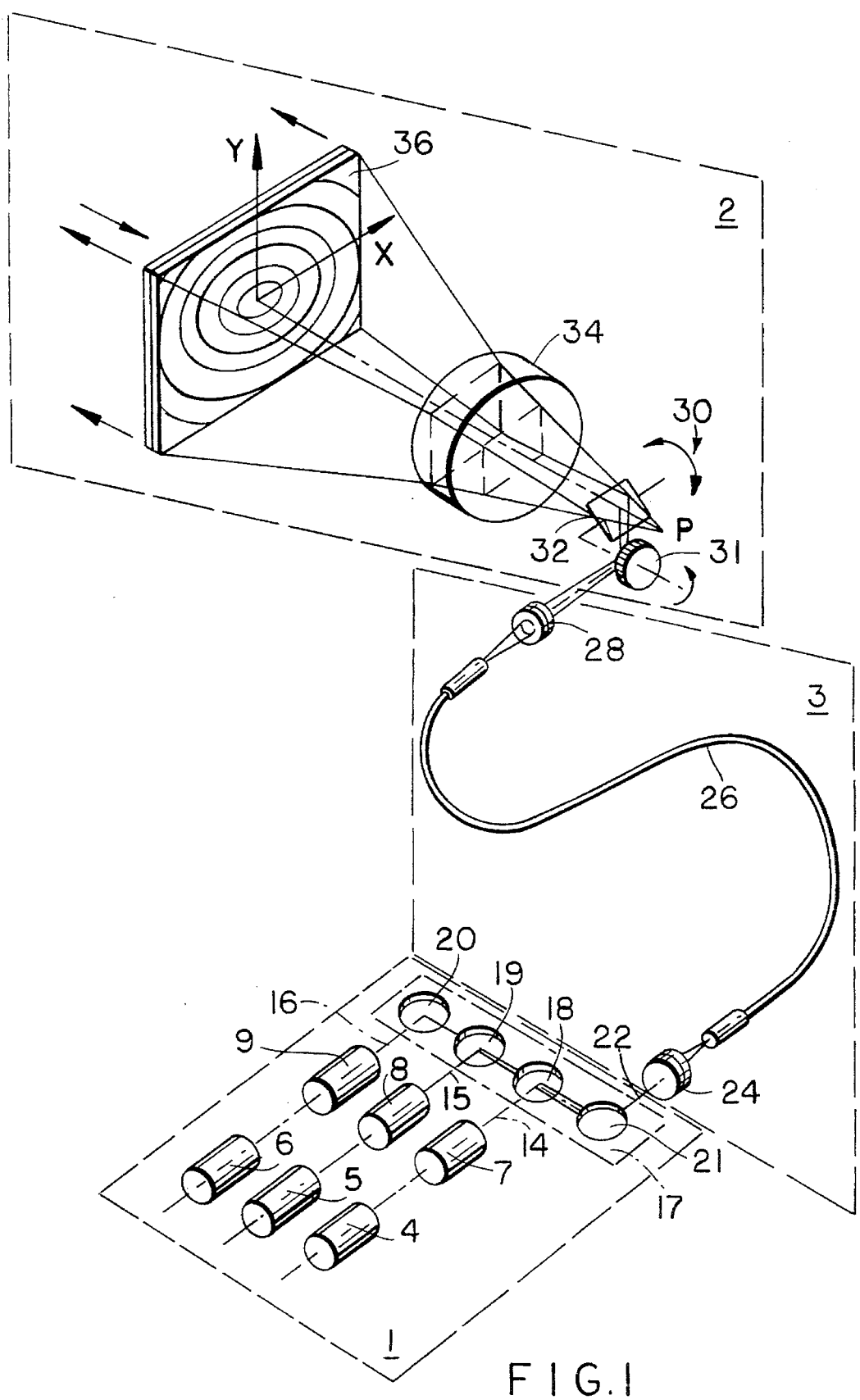
FIG. 1 shows an embodiment example for a video projection system, according to the invention, in which the light transmission device contains a multimode fiber.

FIG. 1 shows a video projection system which is divided into two component groups 1 and 2 which are only indicated schematically. The first component group 1 serves for light generation and modulation and the second component group 2 serves to scan the picture and lines for the projection of a television picture on a screen 36. A light transmission device 3 which forms a light path between the first component group 1 and the second component group 2 is provided in the embodiment example shown in FIG. 1 for transmitting light.

The first component group 1 serves to generate the intensity-controlled light bundle used for the video projection. In the embodiment example shown in FIG. 1, three light sources 4, 5, 6 in the form of laser light sources are provided for the three colors of a color video picture. The light bundles exiting from these light sources 4, 5, 6 are controlled in intensity by modulators 7, 8, 9 for generating a desired color specification of the definitive picture point. The modulators 7, 8, 9 can contain DKDP crystals as the essential control element for controlling the intensity. Due to these modulators, the light sources 4, 5, 6 can be operated in continuous mode. This technique is particularly advantageous when using lasers, since it guarantees greater stability on the one hand and, on the other hand, also allows a sufficiently fast change in the light intensity for producing a laser video picture. In other constructions, e.g. when the light sources 4, 5, 6 are formed by LEDs, the modulators 7, 8, 9 are no longer necessary because LEDs can be controlled directly and are also fast enough for a video picture.

Light bundles 14, 15, 16 exit from the light sources 4, 5, 6 with the modulators 7, 8, 9 and are combined by an optical arrangement 17 to form a common light bundle 22. For this purpose, the optical arrangement 17 uses mirrors 18, 19, 20. Two of the mirrors 18, 19 are constructed as dichroic mirrors which have different reflective characteristics and transmittance characteristics with respect to the wavelength of the light. By orienting these dichroic mirrors in a suitable manner, it is possible to pass or reflect the entire beam, i.e. to combine virtually 100% of the total light intensity in a common beam path. An additional mirror 21 which reflects the common light bundle 22 is arranged in the common beam path. However, the mirror 21 serves not only for deflection, but also for the alignment of the common light bundle 22 in an optical system 24 coming first with reference to the light path. This serves to focus the light bundle on the core of an optical fiber 26 which is constructed as a multimode fiber and is suitable for transmitting all light bundles emitted from the light sources 4, 5, 6. The damping coefficients of the optical fibers depending on the wavelengths should not diverge from one another by more than 15%. Differences in damping could be compensated for by variously controlling the intensity for the light bundles 14, 15, 16.

Multimode fibers conventionally have a core in the order of magnitude of 100 μm. Because of this, the number of total reflections varies depending on the location at which a light beam from the light bundle 22 strikes the core of the optical fiber. As a result, the coherence characteristic of the incident light bundle is influenced over very long transmission distances when transmitted in a multimode fiber 26 and the Gaussian intensity profile of a light bundle, which is otherwise radial, is greatly expanded. This effect decreases with improvement of the focussing through the first optical system 24 on one point concentric to the core axis. Therefore, it is advisable to design the first optical system 24 for the best possible focussing in the center of the optical fiber 26. For this purpose, the center of the optical fiber 26 on the input side lies in the image-side focal point of the first optical system 24.

After exiting the optical fiber 26, the light reemerges in the form of a cone and the exiting light bundle is bundled again by a second optical system 28 and imaged in a point which is then projected onto a screen 36 via a projection system. The projection is effected by means of the second component group 2. A deflecting device 30 which is constructed in the example shown in FIG. 1 as a mechanical deflecting device having a polygonal mirror 31 and a swiveling mirror 32 serves for picture and line scanning.

The deflected light bundle then enters an optical system 34 which projects it onto the screen 36. In the embodiment example shown in FIG. 1, the optical system 34 serves not only to focus the light bundle on the screen 36, but also to enlarge the solid angle covered by the deflecting device 30 with reference to the imaging of the light bundle on the screen 36. The distance of the screen 36 from the deflecting device 30 can accordingly be very short. Thus, in addition to the spatial separation into two component groups, the optical system 34 also enables a flatter construction.

Due to the constructional separation of the component groups 1 and 2 and due to the light transmission device 3, it is possible to decouple the two component groups 1 and 2 structurally so that the first component group 1 can be arranged in an optional position with respect to the second component group 2. For example, if the first component group 1 is arranged vertically, it can be accommodated practically at the base of a video projection system so that the flat construction is determined substantially only by the distance of the screen 36 from the deflecting device 30. This distance can be reduced considerably by means of the optical system 34. With such a construction, it would be possible to provide a video projection system having a screen diagonal of 2 m and a depth of only 60 cm.

Figure 2:
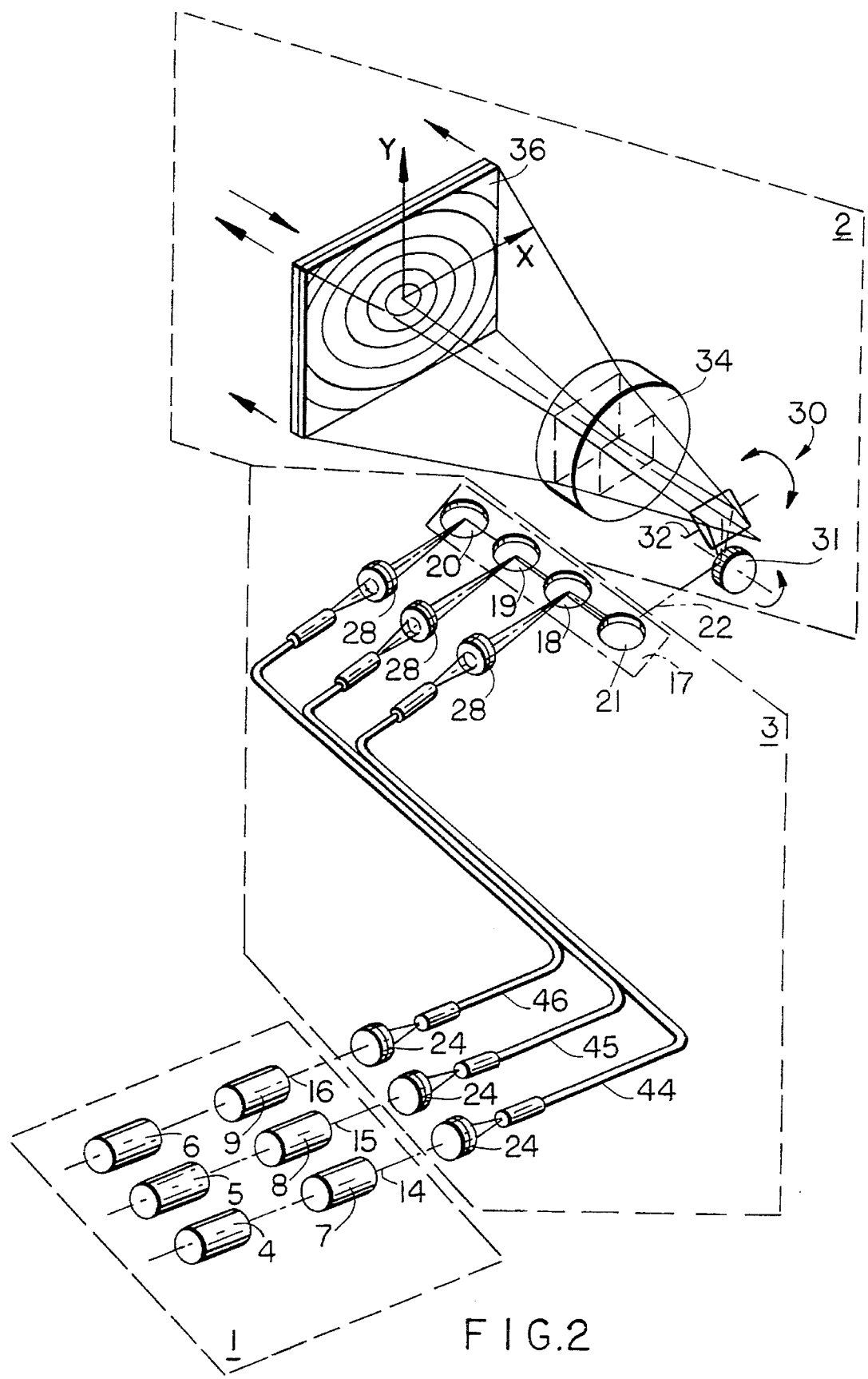
FIG. 2 shows the embodiment example according to FIG. 1, but with three monomode fibers in the light transmission device.

FIG. 2 shows an embodiment example in which the optical arrangement 17 combining the light bundles 14, 15, 16 to form a common light bundle 22 is no longer situated within the first component group 1, but rather at the output of the light transmission device 3. In the example shown in FIG. 2, each light beam 14, 15, 16 is coupled into its own individual optical fiber 44, 45, 46 by an individual optical system 24. The optical fibers 44, 45, 46 are constructed here as monomode fibers.

The light exiting from the optical fibers 44, 45, 46 is decoupled again by a second optical system 28 and combined by means of an optical arrangement 17 to form a common light bundle 22 which is deflected and projected in the second component group 2 in the same manner as described with reference to FIG. 1.

The combination of the light bundles 14, 15, 16 in a common light bundle 22 by means of the optical arrangement 17 is carried out in the embodiment examples in FIGS. 1 and 2 by means of mirrors 18, 19, 20. However, since optical fibers are used in these examples, the light bundles 14, 15, 16 can also be combined simply by means of components of the integrated optical system, e.g. by means of a fiber-optic coupler with a plurality of input fibers and an output fiber in which the light-guiding cores of the output fiber and input fibers are optically connected. In so doing, the light bundles are combined in that they pass over into the output fibers from the input fibers. When using such components, the mirrors 18, 19, 20 and 21 can be omitted. Thus, in the example shown in FIG. 2, only one individual second optical system 28 would be required to image the light from the output fiber into the deflecting device 30.

Figure 3:
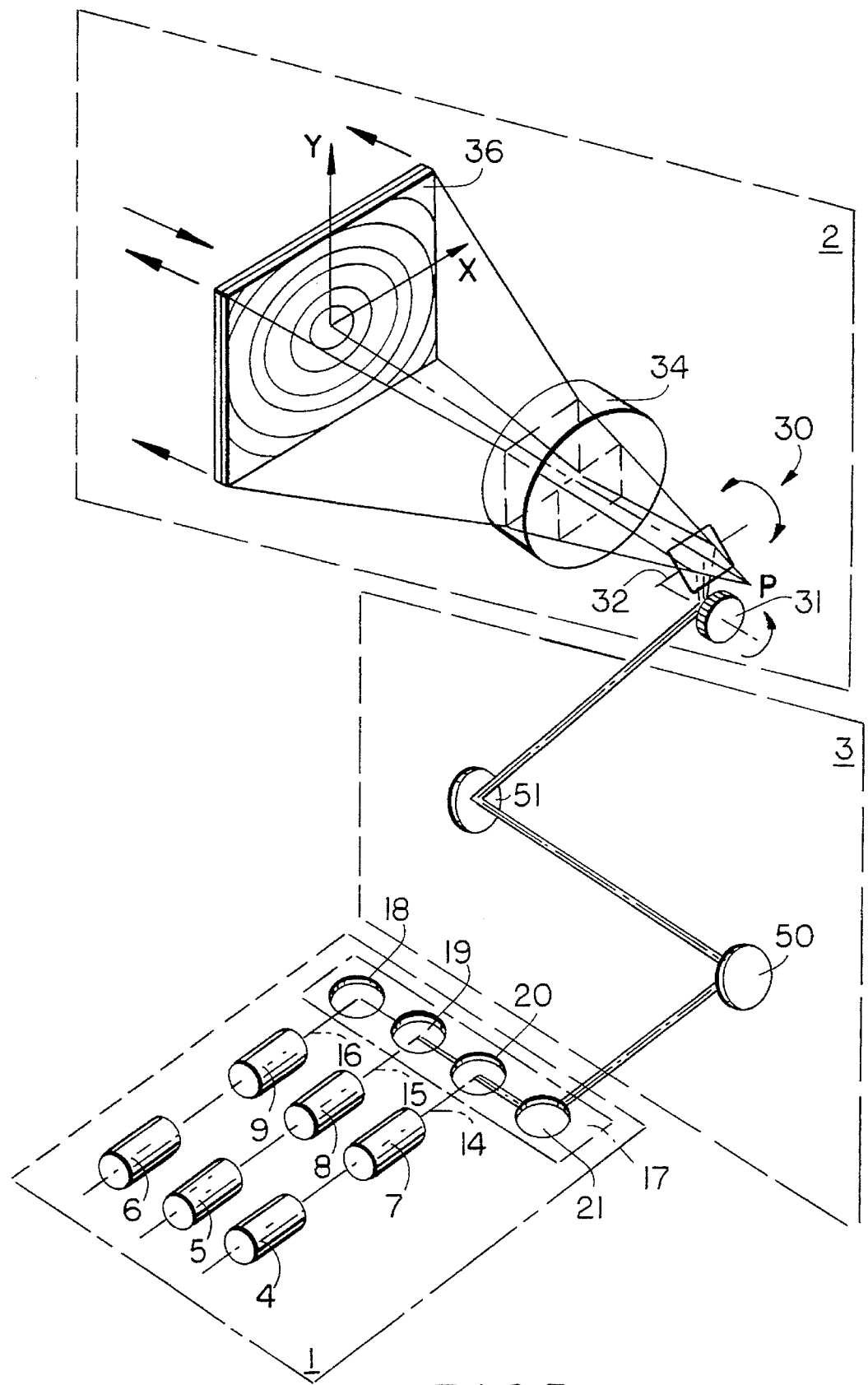
FIG. 3 shows an embodiment example corresponding to FIG. 1, but with mirrors in the light transmission device.

The embodiment example according to FIG. 3 has a substantially simpler construction than the embodiment examples in FIGS. 1 and 2, since it dispenses with the first and second optical systems 24 and 28. The deflection from the first component group 1 to the second component group 2 is effected in this instance by mirrors, which is only indicated schematically in FIG. 3 by two mirrors 50, 51. Such a light transmission device is substantially less costly than those shown in FIGS. 1 and 2. However, large distances and complicated light paths can only be overcome with difficulty without the possibility of adjusting the mirrors 50 and 51. The embodiment example of FIG. 3 is particularly suitable for very compact systems.

On the other hand, tests have shown that distances of up to 50 m can be overcome easily with the arrangements according to FIG. 1 and FIG. 2.

The construction of the light transmission device 3 from mirrors or from optical fibers or from a combination of both substantially depends on the intended purpose, the compactness of construction or spatial arrangements and on the feasibility of cost.

While the foregoing description and drawings represent the preferred embodiments of the present invention, it will be obvious to those skilled in the art that various changes and modifications may be made therein without departing from the true spirit and scope of the present invention.

What is claimed is:

1. A video projection system for producing picture points of a video picture on a screen by picture and line scanning, comprising:

a first component group containing at least one light source which can be controlled in intensity and having a light output from which at least one light bundle exits, said first component group including means for modulating the intensity of said one light source with video information;

a second component group having a deflecting device and having a light input through which a light bundle can be imaged into the deflecting device;

a light transmission device having an output for optically connecting the light output of the first component group with the light input of the second component group and for allowing an optional arrangement of the two component groups relative to each other; and an optical system arranged between said output of said light transmission device and said deflecting device for bundling the light exiting from said light transmission device.

2. The video projection system according to claim 1, wherein the light transmission device contains a mirror system.

3. The video projection system according to claim 2, wherein the position of the mirrors relative to each other is adjustable.

4. The video projection system according to claim 1, wherein the light transmission device contains at least one optical fiber.

5. The video projection system according to claim 4, wherein said at least one optical fiber is a multimode fiber.

6. The video projection system according to claim 1 for a color video picture with at least three light sources of different wavelengths, wherein an optical arrangement is provided which combines the light bundles emerging from the light sources to form a common light bundle.

7. The video projection system according to claim 5, wherein said multimode fiber transmits the various wavelengths without damping.

8. The video projection system according to claim 5, wherein said multimode fiber transmits the various wavelengths so that the difference in damping from one wavelength to another is insubstantial so that the maximum deviation is less than 15%.

9. The video projection system according to claim 6, wherein the optical arrangement for combining the light bundles contains dichroic mirrors.

10. The video projection system according to claim 5, wherein the light transmission device for transmitting the light bundles generated by the light sources contains a monomode fiber for each wavelength.

11. The video projection system according to claim 4, wherein a first optical system which couples the incident light into the optical fibers is arranged on the input side of the light transmission device.

12. The video projection system according to claim 11, wherein an image-side focal point associated with the first optical system is situated in the light entry surface of the optical fiber.

13. The video projection system according to claim 12, wherein a second optical system which directs the light exiting from the optical fibers into the deflecting device is arranged at the output side of the light transmission device.

14. The video projection system of claim 13, wherein said second optical system bundles the light exiting from the optical fibers into the deflecting device.

15. The video projection system of claim 13, wherein said second optical system focusses the light exiting from the optical fiber into the deflecting device.

16. The video projection system according to claim 13, wherein an aperture associated with the second optical system is designed in such a way that the light beam exiting from the optical fiber is fully covered by the aperture.

17. The video projection system according to claim 13, wherein an object-side focal point associated with the second optical system is arranged in the light outlet surface of the optical fibers.

18. The video projection system according to claim 1, wherein an optical system is provided between said deflecting device and a screen and, on the output side, said optical system enlarges the solid angle covered by the deflecting device on the input side when deflecting the light bundle for picture and line scanning.

Add new claims 19 and 20 as follows:

19. The video projection system according to claim 1, wherein said deflecting device of said second component group is constructed as a mechanical scanning device.

20. The video projection system according to claim 19, wherein said mechanical scanning device includes a polygonal mirror and a swiveling mirror.

\* \* \* \* \*